Patented Aug. 20, 1935

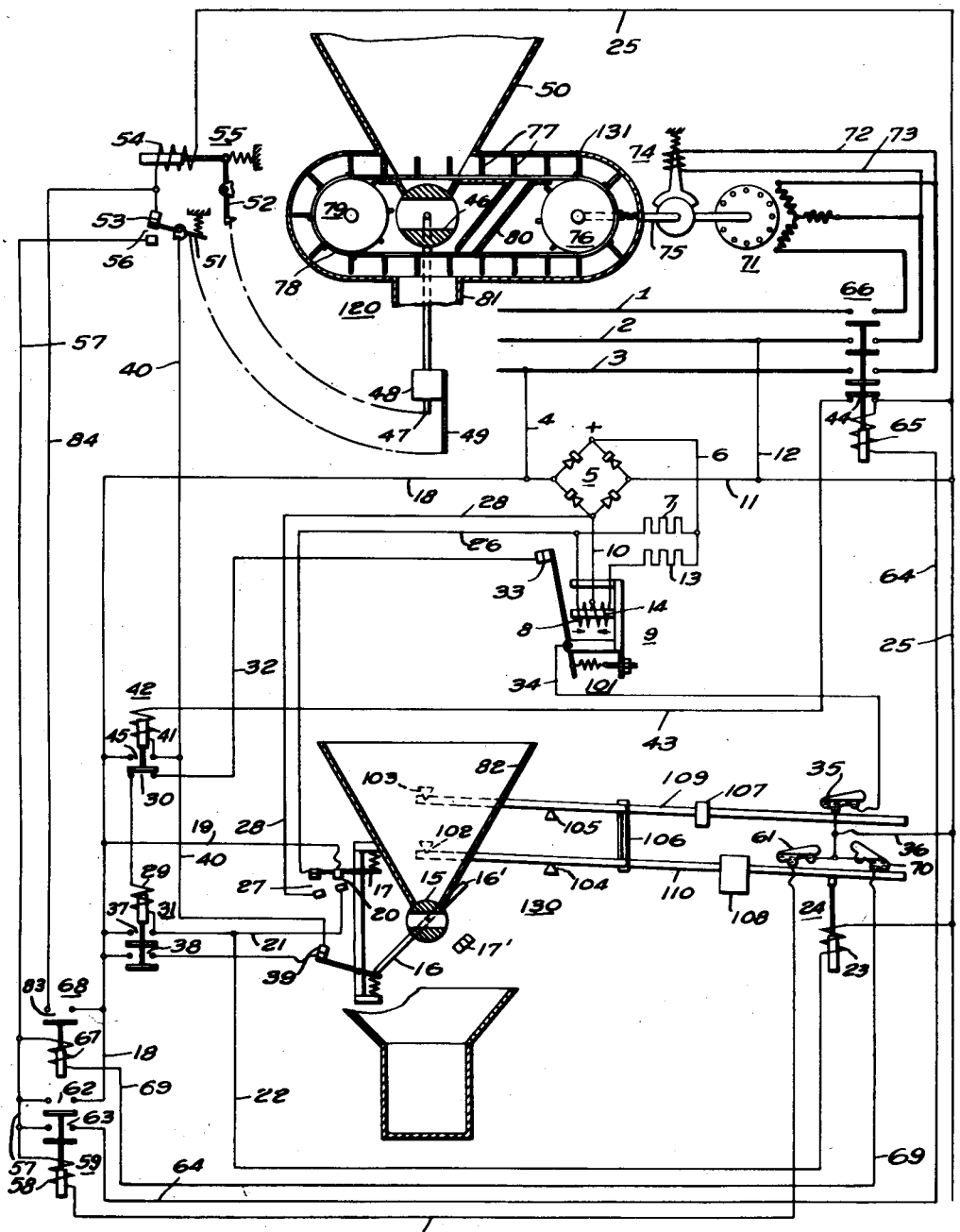

2,011,608

UNITED STATES PATENT OFFICE 2,011,608

AUTOMATIC WEIGHING MACHINE

John H. Belknap, Forest Hills, Pa., assignor to Westinghouse Electric & Manufacturing Company, East Pittsburgh, Pa., a corporation of Pennsylvania Application May 25, 1932, Serial No. 613,422

8 Claims. (Cl. 249—46)

This invention relates to electrically controlled weighing devices.

More particularly, this invention relates to an electric control system for controlling weighing mechanisms to substantially automatically weigh material.

In the building of concrete highways, the quality of the paved surface and body of the paving material is very greatly determined by the relative proportions of sand, gravel and cement. This is so well recognized that state highway commissions by authority of statutes require accurate weighing of the material utilized by contractors during the paving operation.

It is an object of this invention to provide electrical control for a weighing machine to automatically weigh sand, gravel, cement or other material.

It is also an object of this invention to rapidly supply material to be weighed to a weighing machine up to a substantially predetermined proportion of a predetermined weight of the material and thereafter more slowly supplying material to the weighing machine until the predetermined weight of the material is quite accurately secured.

Another object of this invention is to electrically control weighing mechanisms to effect a weighing operation only in a predetermined sequence.

It is also an object of this invention to prevent successive operations of a weighing device without having all the material weighed at each operation removed from the weighing device.

A further object of this invention is to expedite the weighing of material without impairing the accuracy of each weighing operation.

A still further object of this invention is to control a motor, operating a machine supplying material to a weighing machine, in response to the operations of the weighing machine.

Other objects and advantages of this invention will become more apparent from a study of the following specification when considered in conjunction with the accompanying drawing, in which the single figure is a diagrammatic showing of an electrical control system organized in cooperative relation with a weighing mechanism.

Referring more particularly to the single figure illustrating my invention, the reference character 120 designates a source of supply and the means for discharging the material from the source of supply to a weighing mechanism 130. The source of supply is provided with a conveyor housing 131, and a motor 71 controlled by a brake 74. A chain or conveyor mechanism 78 is disposed in the conveyor housing and is operated to agitate and discharge the material in the hopper 50 through the valve 46, chute 80, and discharge pipe 81.

The weighing mechanism 130 is provided with a valve 15 for discharging the material weighed and is provided with a tare beam 109 and a weighing beam 110. Each of these beams cooperates with hopper supporting trunnions 102 and 103 and with fulcrums 104 and 105. To bring the weighing mechanism in cooperative relation with the motor-operated supply means, a plurality of relays, mercoid switches, a time-limit device and a rectifier are provided.

To more clearly appreciate the novel results attained by this invention, a sequence of operation will be given.

Assuming that the conductors 1, 2 and 3 are energized by the closing of a suitable circuit breaker interposed between these conductors and a source of alternating-current, an energized circuit is established from the energized conductor 3 through conductor 4, a portion of the double wave rectifier 5, conductor 6, resistor 7, magnetizing coil 8 of the time-limit device 9, conductor 10, a portion of the rectifier 5 and conductors 11 and 12 to the energized conductor 2. Another circuit is established from the energized conductor 6 through resistor 13, and neutralizing coil 14 of the time-limit device 9 to the energized conductor 10.

The time-limit device 9 may be of any suitable design so long as the device operates to close the contact members 33 after the lapse of a predetermined interval of time, which, in this particular installation, may be adjusted to have any value somewhere between two and fifteen seconds. The time-limit device is provided with an adjustable spring mechanism 101 which, in cooperation with the neutralizing coil 14, determines the time constant of the time-limit device. The neutralizing coil, when both the magnetizing coil 8 and the neutralizing coil 14 are energized, is of negligible strength; however, when the magnetizing coil is shunted, the neutralizing coil destroys the residual magnetism in the magnetic circuit and thus effects the closing of contact members 33 a definite time after the shunting of the magnetizing coil 8.

In the proper weighing operation to successively weigh predetermined amounts of material, the discharge valve 15 of the weighing mechanism 130 is manually operated in a clockwise direction by the lever 16 to open the hopper 82. The valve is provided with a lever 16' which cooperates with a latch 17' whereby the valve is held open as long as desired to discharge the material in the hopper 82. When the lever 16 is moved in a clockwise direction to open the valve 15, it engages the lever 17, thereby closing the contact members 20 and 27. Closing of the contact members 27 establishes a shunt circuit for the magnetizing coil 8, which circuit may be traced from conductor 26 through the contact members 27 to conductor 28. Since the magnetizing coil 8 is thus shunted, the contact members 33 will be caused to close after the lapse of a predetermined interval of time.

The closing of the contact members 20 establishes a circuit from conductor 3 through conductors 4, 18 and 19, contact members 20, conductors 21 and 22, actuation coil 23 of weighing beam release mechanism 24 and conductors 25, 11 and 12 to the energized conductor 2. Energization of the weighing beam release mechanism 24 releases the weighing beam 110 from the trunnion 102 and also releases the tare beam 109 by reason of the fact that the link 106 is caused to hang loosely on the tare beam 109.

In actual operation, trunnions 102 and 103 may be but one pair of elements and the beams 109 and 110 are designed to cooperate with but one pair of these trunnions. The showing adopted herein is merely for the purpose of simplifying the explanation of the operation of this invention.

The weight 107 is so positioned on the beam 109 that, when the beam 110 is released, the beam 109 will assume a horizontal position when the hopper 82 is completely free of any material that has been weighed. Furthermore, when beam 109 is in a horizontal position, mercoid switch 35 closes its contact members to effect an operation more specifically described hereinafter.

It is obvious that, when the beam 110 is released, thus raising the relatively heavy weight 108, the hopper 82 will be supported only by the trunnions 103, and beam 109 will be raised to slope in a direction opposite to that shown in the figure, thus holding the contact members of the mercoid switch 35 in open position so long as any material should be in the hopper 82. However, when the hopper 82 is completely empty and the beam 109 has assumed a horizontal position, mercoid switch 35 closes its contact members thereby establishing an energized circuit, provided the contact members 33 of the time-limit device 9 have, in the meantime, closed. One of the main purposes of the time-limit device 9 is to prevent premature initiation of the sequence of operation hereinafter discussed. This is accomplished by holding the circuit for the actuating coil 29 of the control relay 31 open for a definite time to permit all of the material that may be in the hopper 82 to be discharged and to permit tare beam 109, after several oscillations, to assume a stable horizontal position.

After the lapse of a predetermined interval of time, and after the beam 109 has assumed a horizontal position, a circuit is established from the energized conductor 18 through conductor 19, contact members 20, conductor 21, actuating coil 29 of control relay 31, back contact members 30 of control relay 42, conductor 32, contact members 33 of the time-limit device 9, conductor 34, the mercoid switch 35 and conductors 36, 25, 11 and 12 to the energized conductor 2. Operation of the control relay 31 establishes its own holding circuit at the contact members 37 and further closes the contact members 38. The attendant thereupon moves the valve 15 in a counter-clockwise direction to the closed position shown, thus closing the contact members 39.

Closing of the contact members 39 establishes a circuit from the energized conductor 18 through contact members 38, contact members 39, conductor 40, actuating coil 41 of control relay 42, conductor 43, and back contact members 44 of the line contactor 66 to the energized conductor 25.

It will be noted that the movement of lever 16 to the position shown removes the shunt circuit for the magnetizing coil 8, thereby interrupting the circuit for the actuating coil 29 of the control relay 31. The control relay 31 keeps the contact members 38 closed for a time sufficiently long to permit the closing of the contact members 39 and the consequent establishment of the circuit heretofore traced for the magnetizing coil 41 of control relay 42. With the operation of control relay 42 a holding circuit through contact members 45 is established for its actuating coil 41 and also an energizing circuit is established for the coil 54 of the latch releasing mechanism 55. It is thus obvious that the valve 46 cannot be latched in an open position unless the circuit for the coil 54 is interrupted.

In practice latch 17' is manually released. The comparatively heavy lever 16, being longer and heavier than 16', freely falls to the position shown. Contact members 39 are thus closed a very small interval of time after contact members 20 are opened. Since control members 37 and 38 remain closed for an instant coil 23 will not be deenergized the instant contact members 20 open but only after contact members 37 open. However, when contact members 37 open coil 23 is deenergized and lever 110 takes the position shown so that mercoid switch 61 is closed and mercoid switch 70 is open.

After the completion of the sequence of operation just discussed, the weighing mechanism 130 is in condition to receive the material from the motor-operated supply mechanism 120. The attendant thereupon moves the weighted valve 46 to the open position. In so doing, the arm 48 engages the lever 51, thereby interrupting the circuit for the latch release mechanism 55 at contact members 53 and closing the contact members 56, the coil 54 being deenergized, the latch 52 engages the lower end of the arm 47 to hold the valve 46 in open position.

The closing of the contact members 56 establishes a circuit from the energized conductor 3 through conductors 4 and 18, contact members 45 of relay 42, conductor 40, contact members 56, conductor 57, actuating coil 58 of motor starting relay 59, conductor 60, mercoid switch 61 and conductor 36 to the energized conductor 25. It will be noted that the mercoid switch 61 is so positioned that the contact members thereof are in circuit-closing position as long as no material has been supplied to the hopper 82 and coil 23 is deenergized. Operation of the relay 59 establishes its own holding circuit through the contact members 62, thereby making the subsequent energization of coil 58 independent of control relay 42. Furthermore, a circuit is established for the line contactor 66, which circuit may be traced from energized conductor 18 through contact members 62, conductor 57, contact members 63, conductor 64, and actuating coil 65 of the line contactor 66 to the energized conductor 25. The motor 71 is, therefore, connected directly to the conductors 1, 2 and 3 and the brake release solenoid of the brake 74 is energized through the conductors 72 and 73. The motor, therefore, starts to operate and through shaft 75 drives the sprocket wheels 76. A pair of chains 78 are mounted on the sprocket wheels 76 and 79 and these chains carry agitating and conveying vanes 77. The whole assembly is mounted in a suitable housing 131 to prevent any loss of material other than through the discharge tube 81. As the chain and vanes are moved through the lower portion of the hopper 50, the material in the hopper is agitated and thereby readily drops through the valve 46 and a small portion thereof is carried from the hopper past the valve to the chute 80 and thus slides into the discharge tube 81.

When substantially 90% of the mass of material to be weighed has dropped into the hopper 82, the weighing beam 110 moves to such a position as to close the contact members of mercoid switch 70, whereupon an energizing circuit is established for control relay 68. This circuit may be traced from the energized conductor 18 through contact members 62 of relay 59, conductor 57, actuating coil 67 of control relay 68, conductor 69, mercoid switch 70 and conductor 36 to the energized conductor 25. Immediately thereafter the contact members 83 of relay 68 close to energize coil 54 of the latch-release mechanism 55 for the valve 46. The circuit for this latch-release mechanism may be traced from the energized conductor 18 through contact members 83 of relay 68, conductor 84 and actuating coil 54 to energized conductor 25. The armature of the latch-release mechanism 53 moves towards the right, rotating the latch 52 in a clockwise direction to release the arm 49. The valve 46, therefore, closes by the action of the weight 48.

With the closing of the valve 46, the rate of flow of the material from the hopper 50 to the hopper 82 is very materially reduced. However, it is not completely cut off because the motor 71 is still in operation and the agitating vanes 77 carry much smaller portions of the material to the chute 80, thereby supplying a small stream of material to the hopper 82. It is, therefore, obvious that the last 10% of the amount to be weighed is supplied to the hopper 82 at a much slower rate so that the falling material does in no wise impair the accuracy of the weighing operation. When substantially 100% of the amount of material to be discharged into the hopper 82 has been received by that hopper, the mercoid switch 61 opens its contact members to deenergize coil 58 of relay 59. With the opening of contact members 63 of relay 59, which takes place immediately thereafter, the line contactor 66 is opened. The motor 71 is, therefore, disconnected from the line and, since the brake releasing coil is deenergized, the brake retards the motor shaft to a standstill very rapidly, thereby preventing the discharge of any additional material into the hopper 82.

From the foregoing explanation, it is thus obvious that the accuracy of the weighing operation is not impaired by the falling of the material and yet the speed of the weighing operation is kept high. It has been found in actual practice that this weighing mechanism keeps the successive amounts weighed thereby accurate to within a small fraction of 1% of the amount desired.

It should be noted that this invention prevents starting of the motor if the operator moves the lower valve to closed position before he has maintained the valve in open position for a period of time sufficiently long to discharge all of the material from the hopper 82. Furthermore, the motor is also prevented from starting if the operator opens the valve 46 before going through the opening and closing operation for the valve 15.

It is, of course, understood that various modifications of this invention may be devices by those skilled in the art, but I wish to be limited only by the scope of the appended claims and the prior art.

I claim as my invention:

1. In a weighing system for weighing material, a weighing device including a plurality of loosely interconnected weighing beams for the device, a valve for discharging material from the weighing device, motor-operated mechanisms for supplying material to the weighing device, and means responsive to the opening and closing of said valve and a predetermined position of one of said beams for effecting the stopping of said motor-operated mechanisms.

2. In a weighing system for weighing material, a weighing device including a tare beam and a weighing beam, motor-operated mechanisms for supplying material to the weighing device, a valve, operable after the weighing of the material supplied to the device, for discharging the weighed material therefrom, means responsive to the opening and closing operations of said valve and to a predetermined position of the tare beam to effect the starting of the motor operated mechanism, and means for stopping the said mechanisms in response to a predetermined position of said weighing beam.

3. In a weighing system for weighing material, a weighing device including a plurality of loosely interconnected weighing beams for the device, a valve for discharging material from the weighing device, motor operated mechanisms for supplying material to the weighing device at one rate, means responsive to the opening and closing operations of said valve and to a predetermined position of one of said weighing beams to change the rate at which the material is supplied to the weighing device, and means responsive to a second predetermined position of the last-named weighing beam to effect the stopping of said mechanisms.

4. In a weighing system for weighing material, a weighing device including a tare beam and a weighing beam, supply means for supplying material to the weighing device, a motor for operating the supply means, a valve, operable after the weighing of the material supplied to the weighing device, for discharging the weighed material therefrom, means responsive to a predetermined positon of the tare beam to effect the starting of the motor operated mechanisms, means responsive to one position of the weighing beam to change the rate at which material is supplied to the weighing device and means responsive to another position of the weighing beam to stop the operation of the motor.

5. In a weighing system for weighing material, in combination, a weighing device including a tare beam and a weighing beam, time-limit means, means responsive to operations of the tare beam and the time-limit means for supplying material to the weighing device, and means responsive to an operation of the weight beam to stop the supply of material to the weighing device.

6. In a weighing system for weighing material, in combination, a weighing device including a tare beam and a weight beam, time-limit means, means for supplying material to be weighed to said weighing device, a motor for operating the material-supplying means, means responsive to a predetermined position of the tare beam for effecting the starting of said motor, and means controlled by said time-limit means to prevent premature starting of said motor.

7. In a weighing system for weighing material, in combination, a weighing device including a tare beam and a weighing beam, time-limit means, means for supplying material to be weighed to the weighing device, a motor for operating the material supplying means, means responsive to a predetermined position of the tare beam for effecting the starting of said motor, means controlled by said time-limit means to prevent premature starting of the motor, and means responsive to a predetermined position of the weighing beam to stop said motor.

8. In a weighing system for weighing material, in combination, a weighing device including a tare beam and a weighing beam, time-limit means, means for supplying material to be weighed to the weighing device, a motor for operating the material supplying means, means responsive to a predetermined position of the tare beam for effecting the starting of said motor, means controlled by said time-limit means to prevent premature starting of the motor, means responsive to one position of the weighing beam to decrease the rate of flow of material from the supply means to the weighing device, and means responsive to a second position of the weighing beam to stop said motor.

JOHN H. BELKNAP.